United States Patent [19]

Hewitt

[11] Patent Number: 5,076,822
[45] Date of Patent: Dec. 31, 1991

[54] VAPOR RECOVERY SYSTEM

[76] Inventor: J. Paul Hewitt, P.O. Box 1091, Angleton, Tex. 77515

[21] Appl. No.: 519,905
[22] Filed: May 7, 1990
[51] Int. Cl.$^5$ .................................................. F25J 3/00
[52] U.S. Cl. ........................................ 62/18; 62/48.2; 55/88
[58] Field of Search ................... 62/18, 48.2; 55/88

[56] References Cited

U.S. PATENT DOCUMENTS

| | | | |
|---|---|---|---|
| 2,001,996 | 5/1935 | Whitman | 62/48.2 |
| 2,494,120 | 1/1950 | Ferro, Jr. | 62/87 |
| 2,765,877 | 10/1956 | Hartman et al. | 183/115 |
| 2,849,150 | 8/1958 | Tompkins | 220/85 |
| 2,947,379 | 8/1960 | Aubrey | 55/88 |
| 3,266,262 | 1/1965 | Moragne | 62/54 |
| 3,303,660 | 2/1967 | Berg | 62/48.2 |
| 3,648,436 | 3/1972 | Schonewald et al. | 55/88 |
| 3,714,790 | 2/1973 | Battey | 62/54 |
| 3,739,551 | 6/1973 | Eckert | 55/90 |
| 3,886,759 | 6/1975 | McNamee | 62/48.2 |
| 3,932,159 | 1/1976 | Goldsberry | 62/87 |
| 3,981,156 | 9/1976 | Modisette et al. | 62/54 |
| 3,992,891 | 11/1976 | Pocrnja | 62/88 |
| 4,027,495 | 6/1977 | Edwards | 62/54 |
| 4,068,710 | 1/1978 | Edwards | 165/111 |
| 4,077,789 | 3/1978 | Edwards | 62/54 |
| 4,490,985 | 1/1985 | Wells | 86/86 |

OTHER PUBLICATIONS

Klatz et al., *Handbook of Natural Gas Engineering*, 1959, pp. 512–513.
Burklin et al., *Background Information on Hydrocarbon Emissions From Marine Terminal Operation-vol. I:Discussion*, pp. 139-146, Nov. 1976.

Primary Examiner—Ronald C. Capossela
Attorney, Agent, or Firm—Kenneth H. Johnson

[57] ABSTRACT

An integrated vapor recovery system is provided in which the absorption oil used is withdrawn from the tank saturated with the vapors. The absorption oil is then chilled to about 35° to 40° F. to produce a lean oil for the absorption column. The absorption column is operated at substantially or below atmospheric pressure, such that the vapors are recovered substantially by absorption alone with very little condensation. The lower pressures also reduce the likelihoods of explosive mixtures.

17 Claims, 1 Drawing Sheet

VAPOR RECOVERY SYSTEM

BACKGROUND OF THE INVENTION

1. Field of the Invention

The present invention relates to vapor recovery systems for preventing the escape of chemical vapor, including hydrocarbon vapors to the atmosphere during the transfer of organic liquid, e.g. gasoline. In particular, the invention relates to recovery of hydrocarbon vapors collected upon the loading and unloading of hydrocarbon transportation vessels such as tank trucks, barges and ships. More particularly, the invention relates to an improvement in the operation of absorber type vapor recovery systems in which the vapors are absorbed in a liquid.

2. Related Art

The art of absorbing vapors in a liquid is old and well known. Generally the vapors are contacted in countercurrent flow with the absorbing medium in an absorber column containing liquid-vapor contact structure. The contact structure may be inert packing or special trays of various varieties. Usually the vapors enter at the bottom of the column and the absorbing medium at the top.

The absorber liquid medium entering the top of the column is most generally referred to as "lean oil", especially in hydrocarbon absorptions, to distinguish it from the liquid leaving the bottom of the column which is called "rich oil" because it is saturated with the absorbed vapors. Typically the lean oil is chilled before introduction to the column to promote condensation as well as absorption of the vapors.

The rich oil from the bottom of the column may simply be combined with the lean oil fed to the column until the lean oil has become saturated with the vapors. At that point the "lean oil" must be replaced or "regenerated" by removal of the absorbed vapors, as by fractional distillation, since it is by definition now rich oil. Such a system is described in Environmental Protection Agency Report EPA/450/3-76-038a entitled "Background Information on Hydrocarbon Emissions From Marine Terminal Operations, Vol. I: Discussion", at pages 139-146.

Another common operation is to continuously "regenerate" the rich oil to lean oil by fractional distillation in a stripping column or stripper while the absorption operation is progressing. The lean oil from the stripper is recycled directly back to the absorber. This system is disclosed in U.S. Pat. No. 3,981,156.

The vapors recovered from the distillation may be liquified and stored for blending into a useful product. Alternatively, the liquified hydrocarbons may simply be returned to the vessel from which they came. The alternative disposition of the recovered vapors is disclosed in the above cited U.S. Pat. Nos. 2,849,150 and 2,765,872.

The vapor recovery systems operated at loading and unloading terminals only have to operate during actual loading and unloading of vessels. Quantities and composition of vapors produced vary with seasonal temperature, size of the vessel and the volatility of the product being loaded or unloaded. Due to the cyclical nature of the operations, one reference, U.S. Pat. No. 2,849,150 includes a control for actuating the vapor recovery system when enough vapors have been collected for efficient operation.

In a typical integrated system the energy requirement for the fractional distillation section is at least twice that for the absorption. During start up of the stripper, all of the equipment must be heated and the equilibrium temperature of the system reached. In prior integrated systems this must occur every time a vessel is loaded or unloaded.

One alternative to stripping the rich oil is to use the product being loaded as the lean oil and returning the rich oil to the storage tank as shown in U.S. Pat. No. 3,714,790. However, as shown in U.S. Pat. No. 3,714,790, the lean oil is chilled to about 5° to 15° F. and a reservoir of the chilled liquid is maintained for start up. Because of the temperatures and pressures used therein, the vapor recovery is mainly by condensation. Additionally because of the pressures the compressed vapors must be saturated to prevent explosive concentrations and promote rapid condensation.

SUMMARY OF THE INVENTION

Briefly the present invention provides an integrated vapor recovery system for recovering vapor from a mixture of vapor and air in which the absorption oil is the liquid from which the vapor originates. The liquid at a first temperature and pressure is withdrawn from a tank or other storage facility and is saturated with the vapors. The absorption oil is then chilled to a second temperature at the first pressure or less to produce a lean oil for the absorption of said vapors. The absorption column is preferably operated at substantially atmospheric pressure, or even below atmospheric pressure, such that the vapors are recovered substantially by absorption alone with very little condensation. The lower pressures used prevents the presence of explosive mixtures. Additional advantages are lower capital costs due to omission of the compression equipment and the lower refrigeration costs associated with the higher temperatures.

More specifically the present invention is the use of an organic liquid, e.g., gasoline or diesel fuel as an absorption oil to recover vapors emanating from said organic liquid, comprising withdrawing a portion of said organic liquid from a stored volume thereof at a first temperature and a first pressure, chilling said organic liquid to a second temperature below said first temperature at a second pressure substantially equal to or less than the first pressure, contacting vapor from said organic liquid in admixture with air with said chilled organic liquid at said second temperature and a third pressure substantially equal to or less than the first pressure, selectively absorbing a portion of said vapors from said vapor/air mixture and returning the vapor-rich organic liquid to said stored volume.

At a given temperature and pressure there is an equilibrium concentration of components between vapor and the liquid, such that the liquid may be characterized as "saturated" with the components which make up the vapor. The liquid is the equivalent of a "rich oil". However, removing the liquid from contact with the vapor and cooling it results in liquid which has a lower concentration of vapor components than it is capable of absorbing, thus it is "unsaturated" and the equivalent of a lean oil.

DETAILED DESCRIPTION OF THE PREFERRED EMBODIMENT

Figure 1:
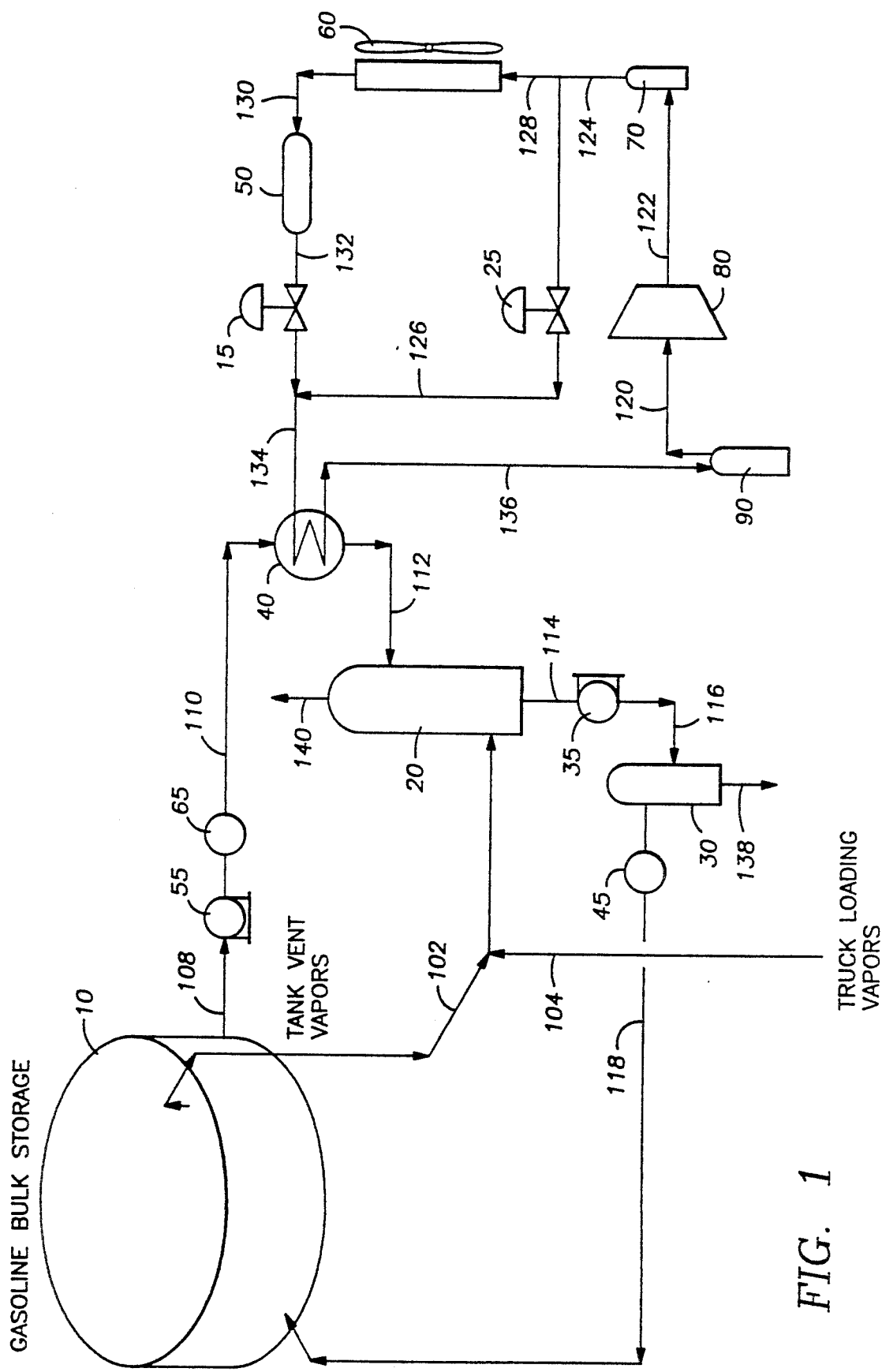
FIG. 1 is a process flow diagram showing major equipment and controls in schematic form.

A detailed description of a preferred embodiment is provided by reference to FIG. 1 which is a flow diagram in schematic form. Major equipment and process controls are identified and may be selected from a reading of the drawing by those of ordinary skill in the art. Ancillary equipment may be added as deemed advisable by the individual designer.

Hydrocarbon vapors in air are taken from a bulk storage tank 10 and/or a truck (not shown) loading or unloading via flow lines 102 and 104 respectively to absorber column 20 and enter near the bottom of the column. Lean oil is taken from the bulk storage tank 10 by pump 55 via suction line 108 through flow line 110 where it is metered by meter 65. The lean oil is then chilled to about 35° to 40° F. in chiller 40 and then passed to the top of the absorber column 20 via line 112 where it is contacted in counter current flow with the vapors in air entering at the bottom of the column 20. Since the liquid component in the bulk storage tank generating the emissions is saturated at a given temperature, refrigeration of a liquid stream from the bulk storage tank will render it undersaturated and capable of absorbing the selective components from the vapor/air mixture.

The air is saturated with hydrocarbon vapors at the temperature of operation which depends upon the season. Additionally, the absorber oil withdrawn from the bulk storage is saturated with hydrocarbon vapor at the conditions. The absorber oil is chilled to the desired temperature so that it is no longer saturated, e.g., about 35° to 40° F., and thus become the lean oil for the absorber column 20.

The temperature difference between the liquid in the tank and the chilled liquid is preferably about 20° to 70° F. The selection of the temperature of the chilled liquid is a balance between the cost of energy for cooling equipment size and the efficiency of the absorption at a given temperature. Since the present invention depends on absorption and not condensation, the temperature is not as low as previously used at given pressures. Generally the chilled temperature of the absorption liquid will not be below 35° F. at atmospheric pressure. Although condensation is not a necessary component of the present invention, it would be expected that at 40° F. at atmospheric pressure there will be a condensation of a small amount of pentenes in a typical gasoline vapor.

For a given gas mixture, the fraction of each component in the gas that is absorbed by the absorbing medium is a function of the equilibrium phase relationship of the components and the absorbing medium, the relative flow rates and the contact stages in the absorber column 20. The phase reaction is a function of the pressure, temperature and composition (degree of saturation) of the absorbing medium. The degree of unsaturation of the lean oil depends upon the chilled temperature, and it will be appreciated that the closer to saturation of the lean oil the greater the volume needed to absorb substantially all of the vapors from the air. Additionally, the greater volume required would necessitate a larger absorber column. The energy cost for pumping the greater volume of lean oil and greater capital cost of the larger column 20 must be balanced against the refrigeration energy and capital cost.

The air, having substantially reduced hydrocarbon vapor content ma be vented to the atmosphere via line 140. The rich oil, containing the hydrocarbon vapors recovered from the air, is removed from the bottom of the column 20 by pump 35 via suction line 114 and then passed through decanter 30 where water is removed via line 138. After the water has been removed in decanter 30 the rich oil is metered by meter 45 and returned to the bulk storage tank 10 via line 118. The difference between the reading of meters 55 and 45 indicates the volume of hydrocarbons recovered.

To the right hand of the figure is shown a typical refrigeration cycle. Gaseous refrigerant is withdrawn from accumulator 90 via compressor suction line 120 and compressed in refrigerant compressor 80. The compressed gaseous refrigerant is then passed via line 122 to filter dryer 70 and thence to refrigerant condenser 60 via lines 124 and 128. The condensed refrigerant is collected in receiver 50 and then passed to expansion valve 15 as needed. A hot gas by-pass line 126 is provided for additional temperature control using control valve 25. The expanded cold gaseous refrigerant is passed to chiller 40 where it cools the lean oil by indirect heat exchange. The warm gaseous refrigerant then passes back to the accumulator 90 via line 136.

The functions of the various elements of the system have been described as a schematic representation. Valves and possibly other conventional hardware have been omitted, but those in the art would be able to routinely select and position these to obtain the functions. Additionally while a typical compression/expansion refrigeration cycle has been shown, any other method for cooling the lean oil to the desired temperature may be utilized.

Although the process and apparatus has been described in regard to a hydrocarbon vapor, the procedure will work for any condensable organic compound entrained in the vapor. In fact if the present system is used at a gasoline truck depot to recover vapors encountered during loading, there may be a variety of organic compounds other than hydrocarbons in the vapor, e.g., methyl tertiary butyl ether (octane improver) methanol, and ethanol (gasoline expanders) Tertiary butyl alcohol (octane improver) methyl tertiary amyl ether (octane improver) and ethyl tertiary amyl ether (octane improver). The term "gasoline" is used herein in its normal and conventional sense, and generally connotes a principally hydrocarbon liquid boiling over the range of 100° to 410° F. and now containing up to 3% (and more in the future) oxygenates as noted above.

The invention claimed is:

1. A process for the recovery of vapors from an air-vapor mixture during the loading of vessel from a storage tank, comprising:
    (a) collecting the air-vapor mixture from the open space in the vessel;
    (b) withdrawing liquid from the storage tank, said liquid being saturated with said vapors;
    (c) chilling the saturated liquid to a temperature such that said liquid is no longer saturated with said vapors;
    (d) passing said air-vapor mixture directly to an absorber column wherein said air-vapor mixture is contacted in counter flow with the chilled liquid at substantially atmospheric pressure thereby absorbing substantially all of said vapor from the air-vapor mixture;
    (e) venting the air substantially free of the vapor to the atmosphere; and (f) returning the liquid from the absorber column containing the absorbed vapor to said storage tank.

2. The process according to claim 1 wherein said saturated liquid is chilled to a temperature of between 35° and 60° F.

3. The process according to claim 1 wherein any water contained in the liquid from the absorber column is removed in a decanter before returning said liquid to said storage tank.

4. The process according to claim 1 wherein said saturated liquid is chilled by indirect heat exchange with refrigerant from a refrigeration plant.

5. The process according to claim 4 wherein said refrigeration plant comprises a refrigerant which is cooled by a compression-condensation-expansion cycle.

6. The process according to claim 2 additionally comprising:
   (g) removing any water contained in the vapor enriched oil in a decanter; and
   (h) returning the vapor enriched oil from the absorber column less the water removed to said storage tank.

7. A process for the recovery of organic vapors emanating from a liquid from an air-vapor mixture, comprising:
   (a) withdrawing a portion of said liquid from a stored volume at a first temperature and a first pressure;
   (b) chilling the withdrawn liquid to a second temperature below said first temperature at a second pressure substantially equal to or below said first pressure;
   (c) passing the air-vapor mixture directly to an absorber column where it is contacted with the chilled liquid at a third pressure substantially equal to or below said first pressure thereby selectively absorbing a portion of said vapor from the air-vapor mixture; and
   (d) returning the vapor containing liquid to said stored volume.

8. The process according to claim 7 wherein said organic liquid comprises principally hydrocarbons.

9. The process according to claim 7 wherein said organic liquid comprises gasoline.

10. A system for the recovery of vapors from an air-vapor mixture during the loading of vessel from a storage tank, comprising:
    (a) a vapor collection line for collecting said air-vapor mixture;
    (b) a lean oil pump taking suction from said storage tank via a lean oil pump suction line;
    (c) an absorber column having first inlet means near the bottom directly connected to said vapor collection line by a flow line and second inlet means near the top connected to said lean oil pump via a lean oil pump discharge line to provide counter current contact between said air-vapor mixture and a lean absorber oil;
    (d) a lean oil chiller in said lean oil pump discharge line to chill the lean oil prior to second inlet means;
    (e) a rich oil outlet means on the bottom of said absorber column to withdraw the absorber oil after contact with said air-vapor mixture;
    (f) refrigeration means connected to said lean oil chiller to provide coolant to cool said lean oil;
    (g) a rich oil pump connected to said rich oil outlet means via a rich oil pump suction line;
    (h) an air outlet means at the top of said absorber column to vent air substantially free of the vapor; and
    (i) a rich oil pump discharge line connected to said rich oil pump to return the rich oil to said storage tank.

11. The system of claim 10 further comprising a water decanter in said rich oil pump discharge line to remove water from said rich oil before returning it to said storage tank.

12. A process for the recovery of vapors from a storage tank, comprising:
    (a) collecting the air-vapor mixture from the open space in the tank;
    (b) withdrawing liquid from the storage tank, said liquid being saturated with said vapors;
    (c) chilling the saturated liquid to a temperature such that said liquid is no longer saturated with said vapors;
    (d) passing said air-vapor mixture directly to an absorber where said air-vapor mixture is contacted in counter flow with the chilled liquid at substantially atmospheric pressure thereby absorbing substantially all of said vapor form the air-vapor mixture;
    (e) venting the air substantially free of the vapor to the atmosphere; and
    (f) returning the liquid from the absorber column containing the absorbed vapor to said storage tank.

13. The process according to claim 12 wherein said saturated liquid is chilled to a temperature of between 35° and 60° F.

14. The process according to claim 13 additionally comprising:
    (g) removing any water contained in the vapor enriched oil in a decanter; and
    (h) returning the vapor enriched oil from the absorber column less the water removed to said storage tank.

15. The process according to claim 12 wherein any water contained in the liquid from the absorber column is removed in a decanter before returning said liquid to said storage tank.

16. The process according to claim 12 wherein said saturated liquid is chilled by indirect heat exchange with refrigerant from a refrigeration plant.

17. The process according to claim 16 wherein said refrigeration plant comprises a refrigerant which is cooled by a compression-condensation-expansion cycle.

* * * * *